Patented Apr. 3, 1928.

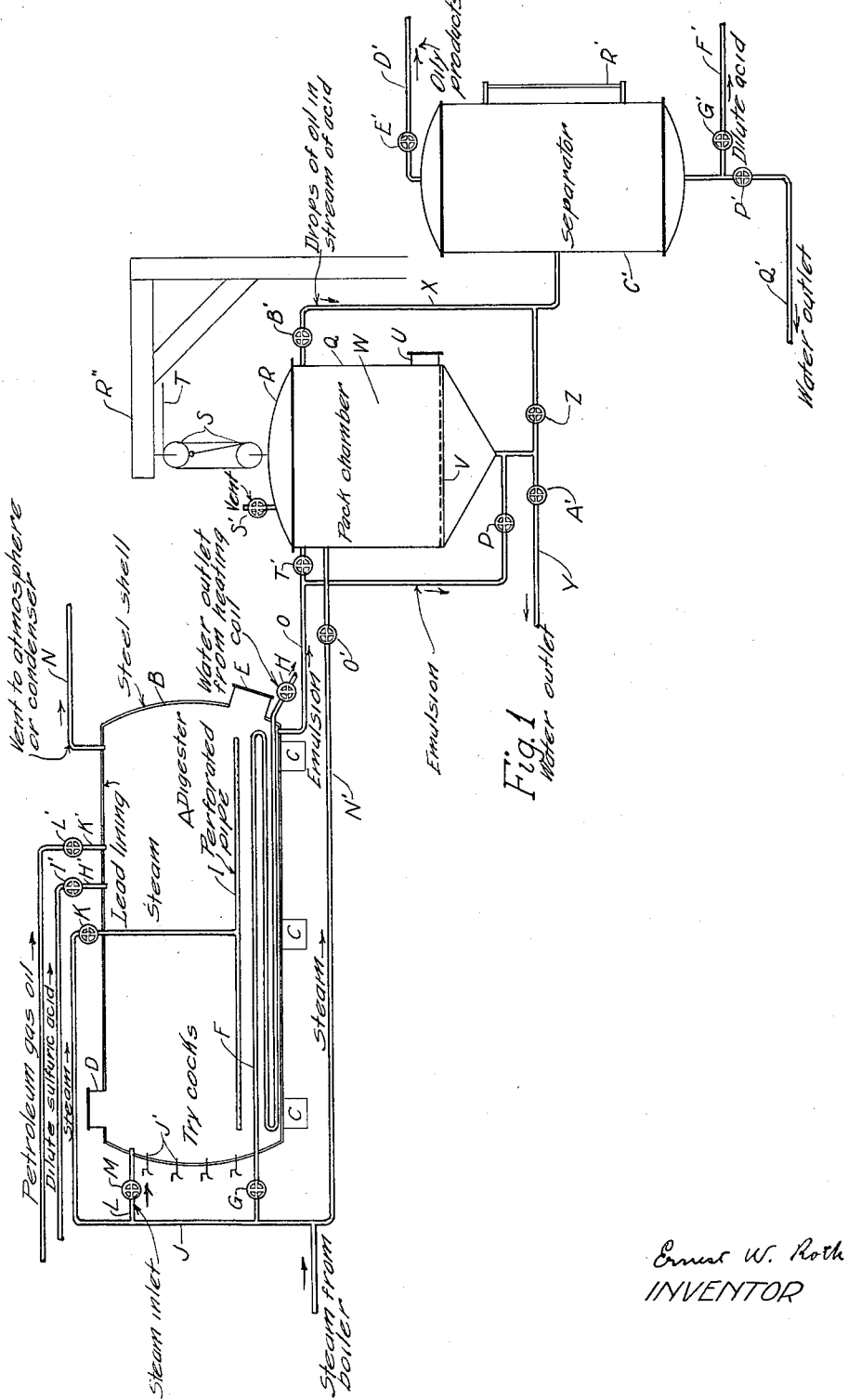

1,665,189

UNITED STATES PATENT OFFICE.

ERNEST W. ROTH, OF LOS ANGELES, CALIFORNIA, ASSIGNOR TO GENERAL PETROLEUM CORPORATION OF CALIFORNIA, OF LOS ANGELES, CALIFORNIA, A CORPORATION OF DELAWARE.

SEPARATION OF ACID-SLUDGE EMULSIONS.

Application filed April 13, 1927. Serial No. 183,593.

My invention is directed to the separation of the emulsions which are formed when acid sludges are treated with water or dilute sulfuric acid by means of jets of direct steam injected thereinto.

In my copending application, Serial No. 183,595, filed April 13, 1927, it is set forth that the sludges produced by the treatment of petroleum products with sulfuric acid may be hydrolyzed and the constituents thereof chemically separated by treating them with dilute sulfuric acid, either with or without the presence of a solvent oil, by heating the mixture and agitating it by means of steam jets. It is stated in the said disclosure that the hydrolysis of the acid sludge to free acid and oil is often accompanied by the formation of an emulsion consisting of dilute acid, separated oil or tar and such solvent oil, as may be added, and it is further therein stated that this emulsion may be broken by various methods, of which one method, to wit:—the heating of the emulsion under pressure to a temperature higher than the normal-pressure boiling point of the acid solution, is therein described and claimed.

The heating of dilute acid to high temperatures involves the use of correspondingly high pressures, up to 100 pounds or even more per square inch, and the heating of relatively large masses of such acid. This not only requires strong and correspondingly expensive apparatus but also is attended by serious danger, as the apparatus is excessively subject to corrosion and consequent failure, and the liberation by such failure by a large body of superheated acid solution is likely to be disastrous in the extreme.

The object of my present invention is to provide a method for breaking the emulsions formed during hydrolysis with dilute acid at atmospheric pressure, which method can be carried at atmospheric pressure, without danger of failure of the apparatus, and without the risk which attends such a failure.

A further object of my invention is to provide a method for separating such emulsions which will consume less steam and fuel and will require less attendance and less expensive apparatus than are required for separation under pressure.

It will be understood that while, in this present application, I describe the manner in which the hydrolysis of the acid sludge is conducted, this description is solely to the purpose of illustrating the origin of the emulsion which it is the sole object of the present invention to break and separate.

The emulsion of dilute acid and hydrolyzed oil which is first formed in the manner hereinafter described, I separate as follows: Without allowing the emulsion to cool I conduct it in a slow stream into a filter pack composed of coarsely granulated acid-resisting material, such for instance as a clean silica sand, which pack is formed inside a lead lined steel shell. Prior to the introduction of the emulsion, this sand pack is heated to a temperature approximating 200° F. by blowing wet steam through the pack, and is preferably acidulated by passing through it a small quantity of hot dilute acid separated in a previous operation. The emulsion in passing through this pack is thereby physically separated into a free acid solution, which adheres to the sand grains, and globules or particles of free hydrolyzed oil floating therein, and the mixture of acid solution and free oil passing out of the pack is thence carried into a separating chamber, in which the acid solution sinks to the bottom and is withdrawn therefrom, while the separated oil rises to the top and overflows through a suitable outlet. The object of the sand pack, as will be seen, is not actually to separate the acid solution from the oil, but rather to cause the fine emulsion particles to coalesce into drops or streams of acid solution and oil respectively, of such size that on their passage into a chamber they will be free to stratify by gravitation into masses which may be separately and continuously withdrawn.

Referring to the attached drawing, which is an entirely diagrammatic cross section of an apparatus suitable for the carrying out of my invention:

A is a digester or hydrolyzing tank, preferably constructed of steel and of such strength as to safely support the weight of the charge, and preferably lined with sheet lead or other acid proof material as indicated at B. C—C are concrete blocks on which the digester may be supported, or it may be suspended from a gallows frame or in any other suitable and known manner. D is a manhole through which acid sludge may be introduced, the plate on this manhole being preferably locked by a temper bar and screw (not shown). E is a similar manhole used for cleaning the apparatus and for obtaining access to its interior. F is a steam coil into which steam under pressure is admitted from a boiler (not shown), the admission of steam through this coil being controlled by the valve G and the discharge of condensed water therefrom by the valve H. I is a perforated pipe of acid proof material lying along the bottom of the digester with the perforations preferably looking downward. Steam is admitted to this pipe through the supply pipe J, which also communicates with the boiler and is controlled by the valve K. L is a pipe admitting steam into the top of the digester, the supply of steam being controlled by the valve M. N is an outlet pipe for preventing pressure from accumulating on the digester, this pipe leading into the open air, or preferably into a condenser (not shown) in which any water or light oil vaporized during the operation may be liquefied. O is a pipe leading out of the digester, preferably at its lowest point, and controlled by the acid proof valve P. The pipe O leads into the pack chamber Q. This chamber may be set below the level of the digester A, so that the contents of the digester may be transferred by gravity, or it may be set on the same or a higher level and the contents transferred by a pump, or other suitable means.

The pack chamber Q should be provided with a cover as indicated at R, which cover should preferably be readily detached and lifted out of the way, as for instance by the derrick R'', the blocks S and the line T. The chamber should preferably be provided with the manhole U located just above the screen V on which the filter pack W is supported. The screen V should be of acid proof material, should be fine enough to retain the sand or grit of which the pack W is composed, and may be supported by a filling of angular fragments of any acid proof material (such for instance as broken fire brick) or by a frame work of acid proof metal, or by any other of the suitable and well known means for supporting such a pack.

The material of which the pack W is composed is a matter of considerable importance. It should not be too fine or the pores of the pack will readily choke with separated free carbon, which often accompanies the sludge emulsion. On the other hand it should not be too coarse or its capacity as a separating medium will be seriously reduced. The proper fineness can be determined for any particular variety of sludge only by experiment but I recommend, without limiting myself to the range of fineness specified that the sand or grit be not coarser than $\frac{1}{8}''$ mesh and not finer than $\frac{1}{16}''$ mesh. The material of which this pack is composed should be of such nature that the hot dilute acid will not act on it chemically, as such action would contaminate the acid and lead to the breaking down of the particles of which the pack is composed. A coarse quartz sand consisting essentially of silica is a preferred material and it is also to be preferred that this material should not be too angular, as it would be for instance if the material were produced by artificially crushing quartz.

The pipe X leads out of the chamber at a point above the top of the sand pack into the separator C' and is controlled by the valve B'. A pipe Y controlled by the valve A' leads out of the chamber at the bottom, preferably from the point of a cone, and is carried to a drain or other place of disposal for waste material.

The separator may be of any of the well known or preferred types of apparatus suitable for separating intermixed liquids by gravity, and the simple type here indicated is shown by way of illustration only. The separator may consist of a cylindrical shell preferably with domed heads, and has leading from it the pipe D' controlled by the valve E' and the pipe F' controlled by the valve G'. The pipe F' is preferably connected to a suitable storage tank (not shown) for the collection and storage of dilute acid. The pipe D' is similarly connected to a tank or other receptacle (not shown) for the accumulation and storage of the oily product of the separation.

The operation of hydrolyzing the sludge and effecting its chemical separation into its constituents is carried out in the following manner: A sufficient quantity of dilute sulfuric acid is conducted into the digester A through the pipe H' controlled by the valve I' from a tank or other source of supply (not shown). The manhole D is opened and the charge of sludge acid is fed into the digester, either in lumps or in melted condition as may be preferred, and the cover then replaced. Steam is then admitted to the coil F by means of the valve G, the water condensed in the coil being discharged through the valve H into a drain or receptacle for condensed water. The valve H may desirably be replaced by one of the well known types of steam trap. The valve K is also partly opened so as to admit steam through the perforated pipe I and the charge is cooked until the tar is completely hydrolyzed, as may be determined by withdrawing samples from the test cock A', and until it is converted into a smooth and homogeneous emulsion which contains no free insoluble sludge. If desired a suitable solvent oil such as petroleum gas oil may be introduced through the pipe K' controlled by the valve L', either prior to or during the cooking of the charge. The gases and vapors evolved from the charge during this digestion period pass out of the digester through the pipe N, either into the atmosphere direct or through a condenser, or to an absorbing apparatus for the neutralization of sulfur dioxid, or to any other suitable place or means for the disposal of noxious gases.

At the end of this operation the sludge orginally placed in the hydrolyzer will have been chemically separated into its elements, these elements being a dilute acid and a thick oil or tar, the latter of which will be in solution in the solvent oil if such has been used, and the said elements will be completely and smoothly emulsified each with the other but will, if the operation has been properly conducted, be free from any material quantity of sludge which has escaped hydrolysis. The production of this emulsion is no part of my present invention and is described here only as preliminary to and as illustrating, the mechanical separation of the sludge into its constituents, which is the subject of my invention. The operations preceding the formation of this emulsion, the proportions and qualities of the materials to be used, and the precautions which must be taken to obtain complete and satisfactory hydrolysis of sludge are all fully set forth in my copending application, Serial No. 183,595.

An emulsion having been formed as above said and as elsewhere described, I proceed to separate it mechanically in the following manner: Live steam, which is preferably not superheated, is admitted to the top of the pack chamber Q through the pipe N' by opening the valve O'. The valve A' may be open and the valve B' closed, allowing the water which condensed by the cooling action of the pack W to escape through the drain, but it is preferable to conduct this steaming with the valve A' closed and the valves Z and P' open, allowing the condensed water to flow out through the pipe Q', to a drain or other suitable point of disposal. Steaming should be continued until a free flow of steam and only a relatively small quantity of condensed water are discharged by the pipe Y or Q' as the case may be, showing that the apparatus has been heated to the highest temperature which can be obtained with wet steam. The steam valve O' and the drain valves A' or P' as the case may be are then closed, and the valve P in the pipe O is partly opened, allowing a relatively small stream of emulsion to flow into the bottom of the chamber Q, to gradually fill the pack and to overflow through the line X. In passing through the sand pack W the emulsion will be broken by the adherence of the dilute acid to the sand grains, and the oil content of the emulsion will be liberated in the form of drops, streams of acid and drops of separated oil rising through the pack and overflowing through the pipe X into the separator C'. During the filling of the chamber and of the separator the bottom valves G' and P' should be closed and the top valve E' opened, the filling of the separator being observed in the sight glass R'.

When the separator is completely filled and oil starts to flow out of the pipe D' the valve E' should be choked down to a small opening and the valve G' opened slightly, the valves P and B' being left wide open. Thereafter the valves E' and G' should be so regulated as to keep the line of separation between oil and acid solution about midway of the sight glass R', a stream of separated oil flowing from the pipe D' and a stream of separated dilute acid flowing from the valve F', each into its designated receptacle.

The flow of oil from digester A through the chamber Q to the separator C' is maintained until the contents of the digester are exhausted or until the sand pack W chokes with the free carbon above mentioned. The pack should be capable under ordinary conditions of handling a number of digester charges before choking from this cause, and it is desirable though by no means essential that two digesters be provided so that they can be used alternately and thus a constant flow of oil maintained through the emulsion breaking system. The same end may be attained at rather less cost by providing a plain tank having about the same capacity as the digester, into which the contents of the digester are transferred at the end of the emulsification step, so that the digester itself may be immediately put to work on a fresh charge.

When the filter pack W has become choked or its separating capacity too much reduced by the accumulation of free carbon in its interstices, it should be cleaned in the following manner: The valve A' in the drain line Y is opened and the liquid contents of the chamber Q are allowed to run to waste, or if preferred, they may be put back into the digester to be treated with a succeeding charge. During this operation the valve B' in the line X should be closed and the vent valve S' should be opened to admit air into the filter shell. When the liquid contents of the chamber have drained out, the valve S' should be closed and a small stream of live steam admitted to the top of the chamber by opening the valve O' in the steam line N'. A sufficient quantity of steam should be used to thoroughly wash down all liquid entrained in the pack W and the application of steam should be continued until no more oil or carbon appear at the end of the line Y. The steam valve O' and the drain valve A' are then closed, the valve B' in the line X is opened and the pack, which has been reconditioned by the steaming, is ready to be recharged and go into operation as before.

In case of damage to the chamber or its contents or of a more complete choking of the pack than can be dislodged by steaming, the cover R of the chamber is removed and lifted out of the way, the plate is removed from the manhole U, and the old sand pack withdrawn and replaced by a new pack of the same material, after which the cover R is replaced as before.

While this description shows the flow of emulsion in an upward direction through the pack, and while this is a preferred method of operation inasmuch as it provides for a more ready and complete cleaning of the pack, it is not essential that filtration be conducted in this direction as excellent results may be had by admitting the stream of emulsion on to the top of the pack and carrying the product to the separator C' from the bottom of the chamber Q, as by opening the valves T' and Z and closing the valves P and B'.

In case carbon should accumulate in the separator C' it may be steamed out by opening the valves B' and Q' and slightly opening the valve O' in the steam line N', all other valves being closed. Steam is thus passed across the top of the filter pack without disturbing its contents, and through the separator shell, thus washing out any sediment which may have accumulated therein.

For conserving heat and preventing any undue condensation of steam, and for maintaining the apparatus at the high temperature which is most favorable to ready breaking and separating of the emulsion, it is desirable that the entire apparatus including the digester A, the chamber Q, the separator C' and all steam and oil pipes, be carefully lagged with heat insulating material.

I claim as my invention:

The method of breaking emulsions of tar and dilute acid resulting from the hydrolysis of acid sludge, which comprises: passing a stream of such emulsion through a pack of granular inert material to produce coalescence of the particles of such emulsion, retarding the flow of the efflux from said pack to permit further coalescence and stratification of the coalesced particles, and withdrawing separately the tar and the dilute acid.

In witness that I claim the foregoing I have hereunto subscribed my name this 5 day of April, 1927.

ERNEST W. ROTH.